United States Patent
Kabasawa

(10) Patent No.: US 6,611,404 B1
(45) Date of Patent: Aug. 26, 2003

(54) DISK APPARATUS HAVING VOICE COIL MOTOR WITH TWO COILS HAVING DIFFERENT NUMBERS OF TURNS

(75) Inventor: Hidetoshi Kabasawa, Saitama-Ken (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/267,746

(22) Filed: Mar. 11, 1999

(30) Foreign Application Priority Data

Mar. 12, 1998 (JP) .......................................... 10-061612

(51) Int. Cl.$^7$ .............................................. G11B 21/02
(52) U.S. Cl. .................................................. 360/266.9
(58) Field of Search ...................... 360/75, 250, 255.1, 360/255.4, 266.9, 264.7, 266.2, 266.4, 266.5, 266.6, 266.7, 266.8; 369/249, 215, 219, 244, 224; 324/173; 310/12

(56) References Cited

U.S. PATENT DOCUMENTS

| | | | | |
|---|---|---|---|---|
| 4,763,314 A | * | 8/1988 | mcCaslin et al. | 369/249 |
| 4,906,923 A | * | 3/1990 | Aoyama | 324/173 |
| 4,908,816 A | * | 3/1990 | Champagne et al. | 310/12 |
| 5,111,088 A | * | 5/1992 | Fujino | 310/12 |
| 5,126,905 A | * | 6/1992 | Nomura et al. | 360/105 |
| 5,138,605 A | * | 8/1992 | Shtipelman et al. | 369/215 |
| 5,818,666 A | * | 10/1998 | Chaya | 360/106 |

FOREIGN PATENT DOCUMENTS

| | | | |
|---|---|---|---|
| JP | 61877 A | * | 6/1986 |
| JP | 61-101856 | | 6/1986 |
| JP | 1-61877 | * | 4/1989 |
| JP | 4-19847 | | 1/1992 |

OTHER PUBLICATIONS

English Translation of Claim of Japanese Laid–Open Utility Model Application No. 62–165772 and English Translation of Abstract of Japanese Laid–Open Utility Model Application No. 4–103356.
Patent Abstracts of Japan, Publication No. 63140654 dated Jun. 13, 1988.
Patent Abstracts of Japan, Publication No. 63064562 dated Mar. 23, 1988.
Patent Abstracts of Japan, Publication No. 63124225 dated May 27, 1988.
Patent Abstracts of Japan, Publication No. 63124226 dated May 27, 1988.

* cited by examiner

Primary Examiner—Hoa T. Nguyen
Assistant Examiner—Tianjie Chen
(74) Attorney, Agent, or Firm—Anderson Kill & Olick, PC; Eugene Lieberstein; Michael N. Meller

(57) ABSTRACT

A disk apparatus has a head carriage and a head carriage drive mechanism. The head carriage has a signal lead wire and a strip of flexible cable extending laterally from the head carriage in a direction X2. The head carriage drive mechanism has voice coil motors located on each side X2 and side X1 of the head carriage, in which a number of turns N2 in a drive coil of a voice coil motor on the X2 side is greater than a number of turns N1 in a drive coil of a voice coil motor on the opposite X1 side. As a result, the X2-side drive coil motor generates a propulsive force greater than that generated by the X1-side drive coil motor by an amount corresponding to the imbalance in load between the two sides.

12 Claims, 7 Drawing Sheets

$N_2 > N_1$

DISK APPARATUS HAVING VOICE COIL MOTOR WITH TWO COILS HAVING DIFFERENT NUMBERS OF TURNS

BACKGROUND OF THE INVENTION

1. Field of the Invention

The present invention relates generally to a disk apparatus, and more particularly to a disk apparatus for writing data to and reading data from a rotating floppy disk by movement of a head carriage.

2. Description of the Related Art

Conventionally, floppy disk apparatuses are widely used in personal computers as external memory devices. In recent years, in an effort to cope with the coming video age, floppy disk apparatuses have begun to be developed that greatly expand memory capacity from the current 1.44 MB to 200 MB or more. In order to expand memory capacity to such a large extent, it is necessary to increase the current 300 rpm rotation speed of the floppy disk by 10 times or more and at the same time increase the current track density of 135 tracks per inch (hereinafter tpi) by 10 times or more, to 2,000 to 3,000 tpi. In order to reliably write and read data under these high-speed, high-density conditions, a high degree of precision is required of the head carriage drive so as to position the magnetic heads with a high degree of precision.

FIG. 7 shows a head carriage drive mechanism 10 for a conventional high-density floppy disk device. The head carriage drive mechanism 10 has a head carriage 11. The head carriage 11 has a head 12 and is moved and positioned longitudinally in the Y1-Y2 direction along a radius of a rotating floppy disk 17 by a first voice coil motor 13 and a second voice coil motor 14 (hereinafter referred to collectively as first and second voice coil motors 13, 14) provided on either side of the head carriage 11 while being supported by guide rods 15 and 16. The first voice coil motor 13 comprises a magnetic circuit structure 23 including a permanent magnet 20 and yokes 21 and 22, and a drive coil 24 fitted to yoke 22 and fixedly mounted on the head carriage 11. The second voice coil motor 14 comprises a magnetic circuit structure 33 including a permanent magnet 30 and yokes 31 and 32, and a drive coil 34 fitted to yoke 32 and fixedly mounted on the head carriage 11. The head carriage 11 moves longitudinally along the Y1-Y2 axis in accordance with the drive current sent through the drive coils 24 and 34. The wire of drive coil 24 and the wire of drive coil 34 have an identical diameter. Further, drive coil 24 and drive coil 34 have an identical number of turns so as to generate an identical propulsive force.

The head carriage drive mechanism 10 shown in FIG. 7 has a signal wire 40, an end of the signal wire 40 being attached to the head 12 and extending from the head 12 along an upper surface of the head carriage 11 in the horizontal X2 direction at a position indicated as 41 in the diagram. The signal wire 40 has an extended section 40a having a length adequate to not restrict the movement of the head carriage 11. The head carriage 11 is moved while moving the extended section 40a of the signal wire 40 (hereinafter extended signal wire section 40a).

At this point, it may be helpful to consider an X2-side load and an X1-side load arising when the above-mentioned head carriage 11 is moved longitudinally in the Y1-Y2 direction. The X2-side load is greater than the X1-side load because the extended signal wire section 40a provided on the X2 side must be dragged in addition to the head carriage 11, thus creating a load imbalance between the X2 side and the X1 side of the head carriage.

Despite the existence of this load imbalance, however, the first and second voice coil motors 13, 14 generate the same propulsive force. As a result, the precision with which the head carriage 11 is driven may deteriorate. In the case of a high-density disk with a track density in the range of 2,000 to 3,000 tpi, even a slight deterioration in the precision with which the head carriage 11 is driven can affect the accuracy and reliability with which data is written to or read from the disk.

SUMMARY OF THE INVENTION

Accordingly, it is an object of the present invention to provide a disk apparatus in which the problems described above are eliminated.

The above-described object of the present invention is achieved by a disk apparatus comprising:

a frame;

disk rotating means for supportably rotating a floppy disk;

a head for writing data to and reading data from a disk being rotated by said disk rotating means;

a head carriage for holding said head, said head carriage being movable in a direction of a radius of a disk supported by said disk rotating means; and a first voice coil motor and a second voice coil motor for moving said head carriage provided on both sides of said head carriage, the first voice coil motor and second voice coil motor each respectively comprising:

a magnetic circuit structure mounted on said frame; and drive coils mounted on said head carriage, wherein said first voice coil motor generates a propulsive force on a first side of said head carriage corresponding to a load arising on said first side when said head carriage is moved, and said second voice coil motor generates a propulsive force on a second side of said head carriage corresponding to a load arising on said second side when said head carriage is moved.

The side on which the load is greater when the head carriage is being moved is driven with a propulsive force larger by just that greater load amount. Accordingly, each side of the head carriage is driven with a propulsive force corresponding in strength to the load on each side, that is, with a propulsive force that differs between the sides by an amount corresponding to the imbalance in load between the two sides.

As a result, it becomes possible to drive the head carriage with better precision and thus position the magnetic head with better precision than when the head carriage is driven with an identical propulsive force on each side. As a result of this more precise positioning, data can be accurately and reliably written to and read from even high-density disks having a track density in the range of 2,000 to 3,000 tpi.

Additionally, the above-described object of the present invention is achieved by the disk apparatus described above, wherein the first and said second voice coil motors are configured so that a number of turns in the drive coil of the first voice coil motor and a number of turns in the drive coil of the second voice coil motor differ so as to generate different respective propulsive forces corresponding to unequal loads on the two sides of the head carriage.

It is possible to alter the settings of the propulsive forces of the first and second voice coil motors, respectively, simply by changing the number of turns of the respective drive coils thereof, making it possible to flexibly accommodate changes in design.

Other objects, features and advantages of the present invention will become more apparent from the following detailed description when read in conjunction with the accompanying drawings.

DESCRIPTION OF THE PREFERRED EMBODIMENTS

A detailed description will now be given of a first embodiment of a disk apparatus according to the present invention, with reference to FIG. 1 and FIG. 2(A), 2(B) and 2(C).

Figure 1:
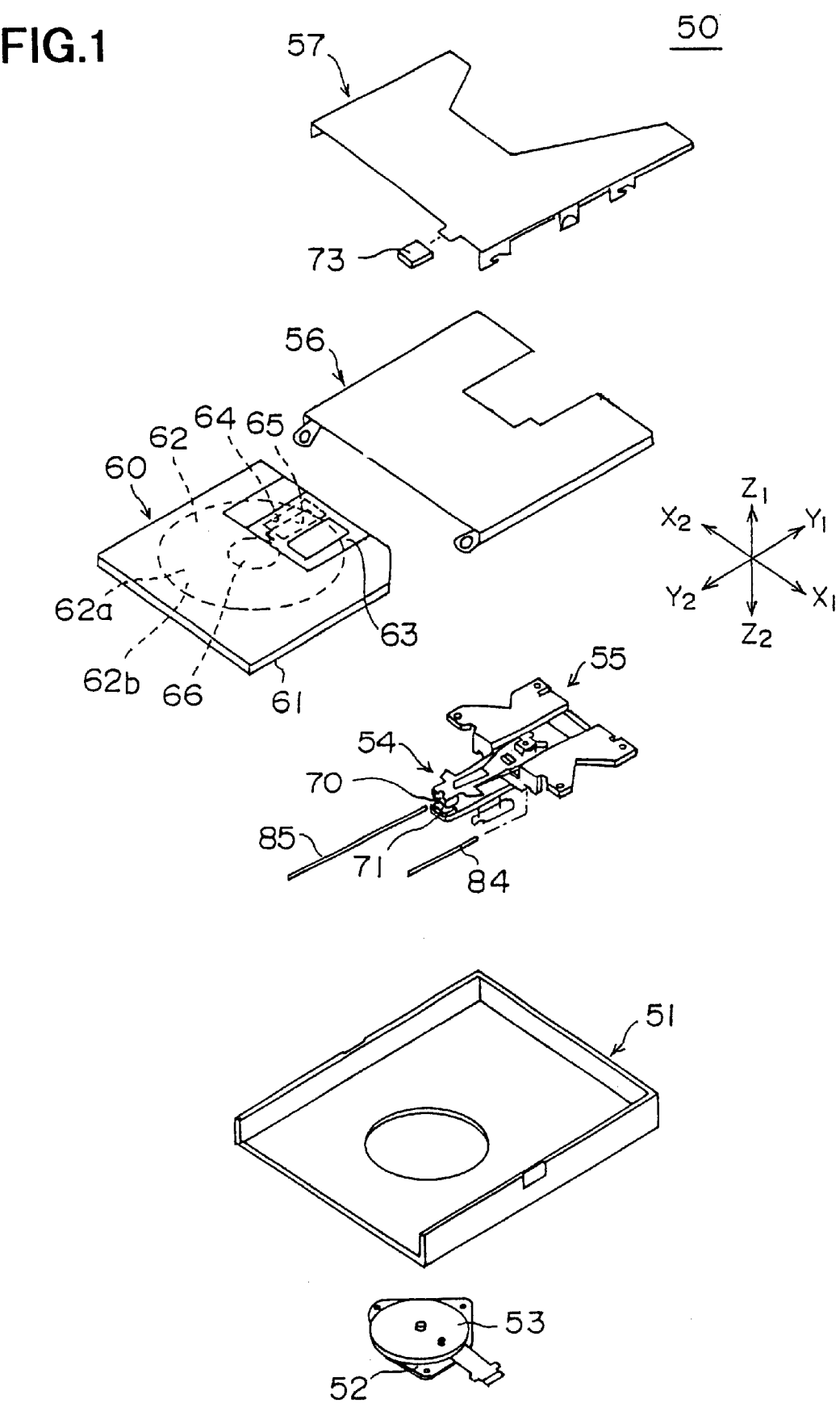
FIG. 1 is an exploded view of a first embodiment of a disk apparatus according to the present invention.
Figure 2A:
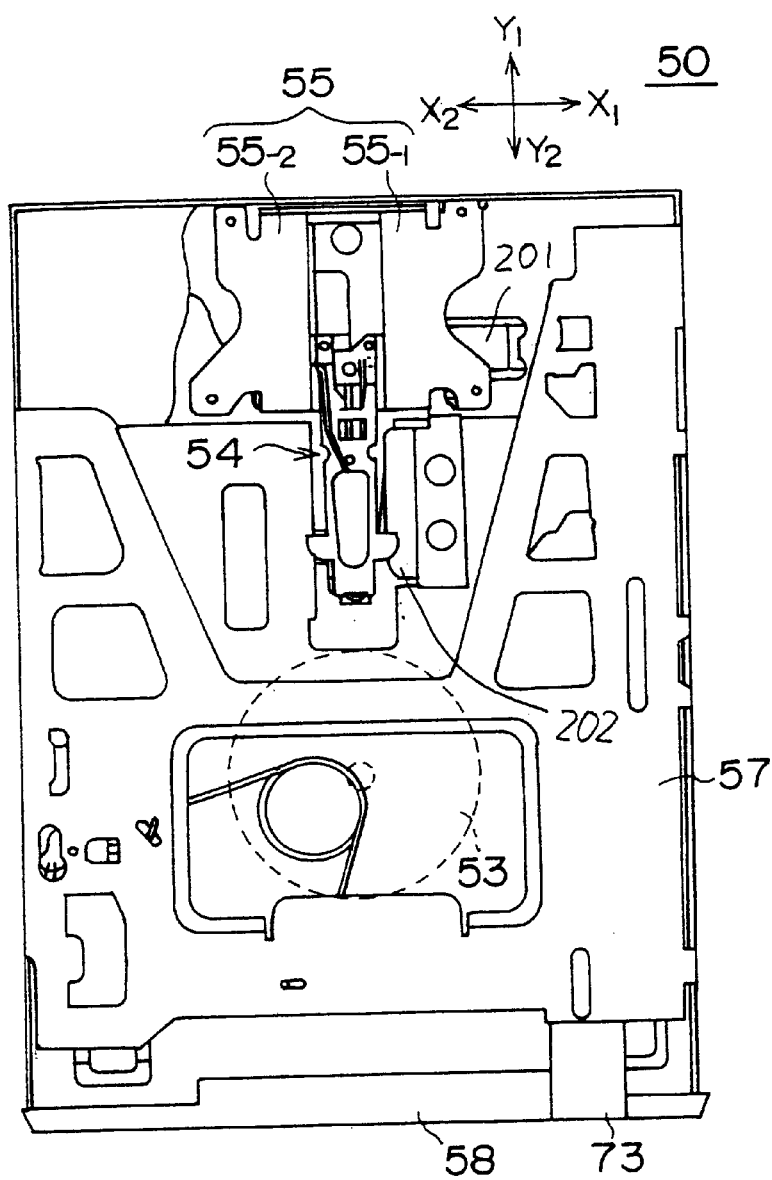
FIG. 2(A), 2(B) and 2(C) are diagrams showing top, front and side views, respectively, of a first embodiment of a disk apparatus according to the present invention.
Figure 2C:
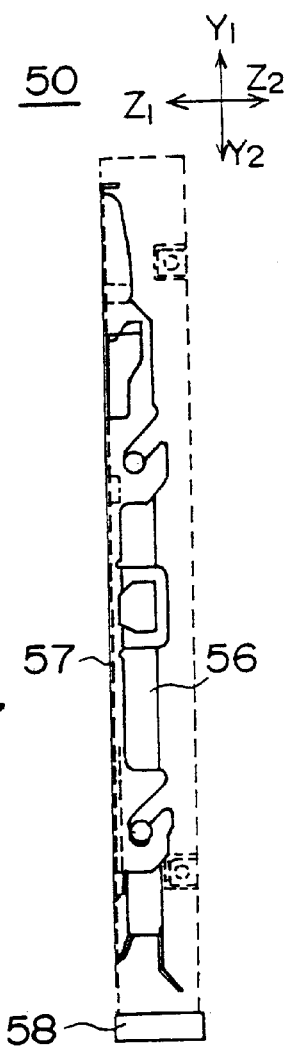
Figure 2B:
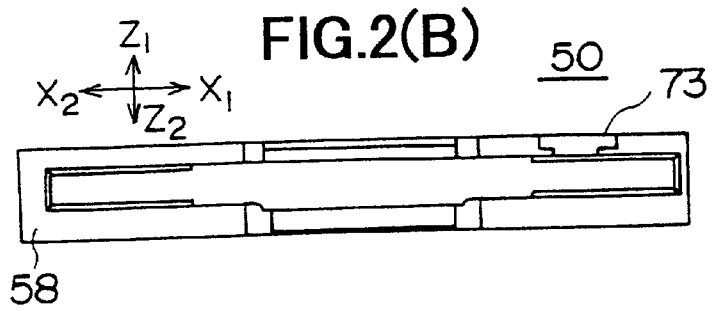

FIG. 1 is an exploded view of a first embodiment of a disk apparatus according to the present invention. FIG. 2(A), 2(B) and 2(C) are diagrams showing top, front and side views, respectively, of said first embodiment of said disk apparatus. X1-X2 represents the horizontal dimension, Z1-Z2 represents the vertical dimension and Y1-Y2 represents the longitudinal front and rear depth dimension.

The floppy disk apparatus 50 is a high-density apparatus, and has a frame 51, a turntable motor 52, a turntable 53, a head carriage 54, a voice coil motor 55, a holder 56, a slider 57 that also functions as a cover, and a front bezel 58.

A disk cartridge 60 is used with the floppy disk apparatus 50. A cartridge body 61 of the disk cartridge 60 contains internally a floppy disk 62 having a diameter of 3.5 inches. Further, a shutter 63 is provided on an edge of the cartridge body 61. The shutter 63 covers an upper opening 64 and a lower opening 65 in an upper and lower surface of the cartridge body 61, respectively. A hub 66 of the floppy disk 62 is exposed at the lower surface of the cartridge body 61.

When inserted from the front bezel 58 toward the rear, that is, in the Y1 direction, the disk cartridge 60 fits inside the holder 56, the shutter 62 slides horizontally in the X2 direction and the openings 64 and 65 are opened. An upper magnetic head 70 opposes the upper opening 64 and a lower magnetic head 71 opposes the lower opening 65. When a lock is released the slider 57 slides toward the front, that is, in the Y2 direction, lowering the holder 56 together with the disk cartridge 60 in the Z2 direction. The disk cartridge 60 is thus loaded into the floppy disk apparatus 50, the hub 66 of the floppy disk 62 is set upon the turntable 53 and the lower opening 65 is placed over the lower magnetic head 71 so as to bring the lower magnetic head 71 into contact with a lower surface 62b of the floppy disk 62. The floppy disk 62 is then rotated by the turntable motor 52 at a speed of approximately 3,600 rpm. Thereafter a head load mechanism (not shown) is activated by a solenoid 201 (see FIG. 2) being excited to lower a lift arm 202. The upper magnetic head 70, which is supported by the lift arm, then descends into the upper opening 64 to contact an upper surface of the floppy disk 62.

The head carriage 54 is moved longitudinally in the Y1-Y2 direction by the voice coil motor 55 and data is written to or read from the surface of the floppy disk, which has been formed into tracks of 2,000–3,000 tpi, by the upper magnetic head 70 and lower magnetic head 71. At this point, the upper magnetic head 70 and lower magnetic head 71 float slightly off the surface of the floppy disk due to the speed with which the floppy disk rotates.

By pressing the eject button 73 the disk cartridge 60 is ejected by moving first upward in the Z1 direction and then forward in the Y2 direction.

A detailed description will now be given of the head carriage 54 and a voice coil motor 55, by reference to FIG. 3 through FIG. 7.

As shown in FIG. 3 through FIG. 7, the head carriage 54 comprises a carriage body 80, an upper head arm 81, a lower magnetic head 71 provided on an upper front edge of the carriage body 80 and an upper magnetic head 70 provided on a lower front edge of the upper head arm 81. Hollow drive coils 82-1 and 82-2 are fixedly mounted on an X1 and an X2 side of the carriage body 80. As is explained below, the head carriage 54 is supported by parallel guide rods 84 and 85 affixed to the frame 51 so as to be movable longitudinally in the Y1-Y2 direction.

Figure 3:
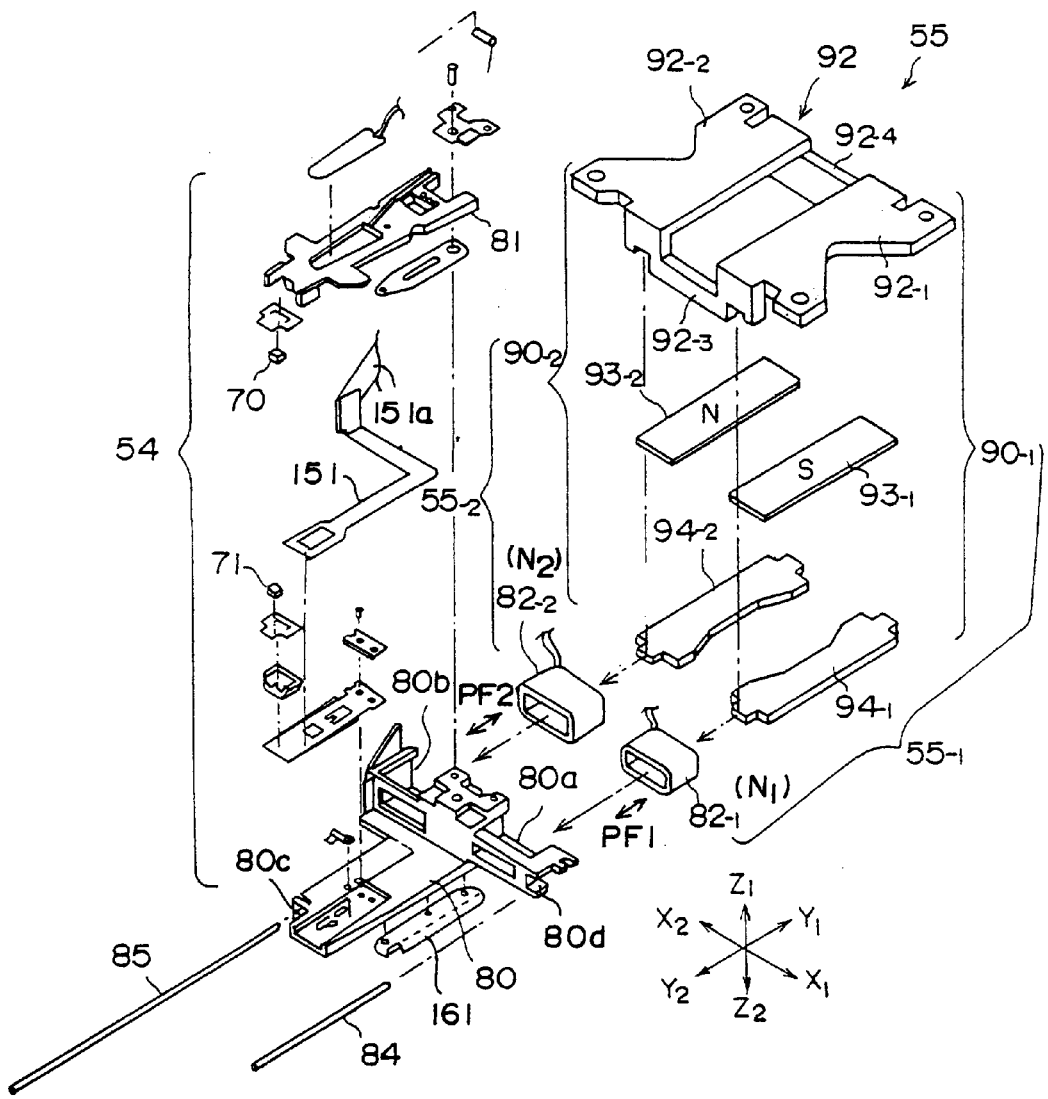
FIG. 3 is an exploded view of a head carriage and a voice coil motor of a disk apparatus according to the present invention.

The drive coils 82-1 and 82-2 are fitted into concave portions 80a and 80b provided on the carriage body 80 and fixedly positioned thereat. As shown in FIG. 3, guide rod 85 is engaged with a bearing portion 80c of the carriage body 80. Guide rod 84 fits into a U-shaped holding portion 80d of the carriage body 80.

Figure 4:
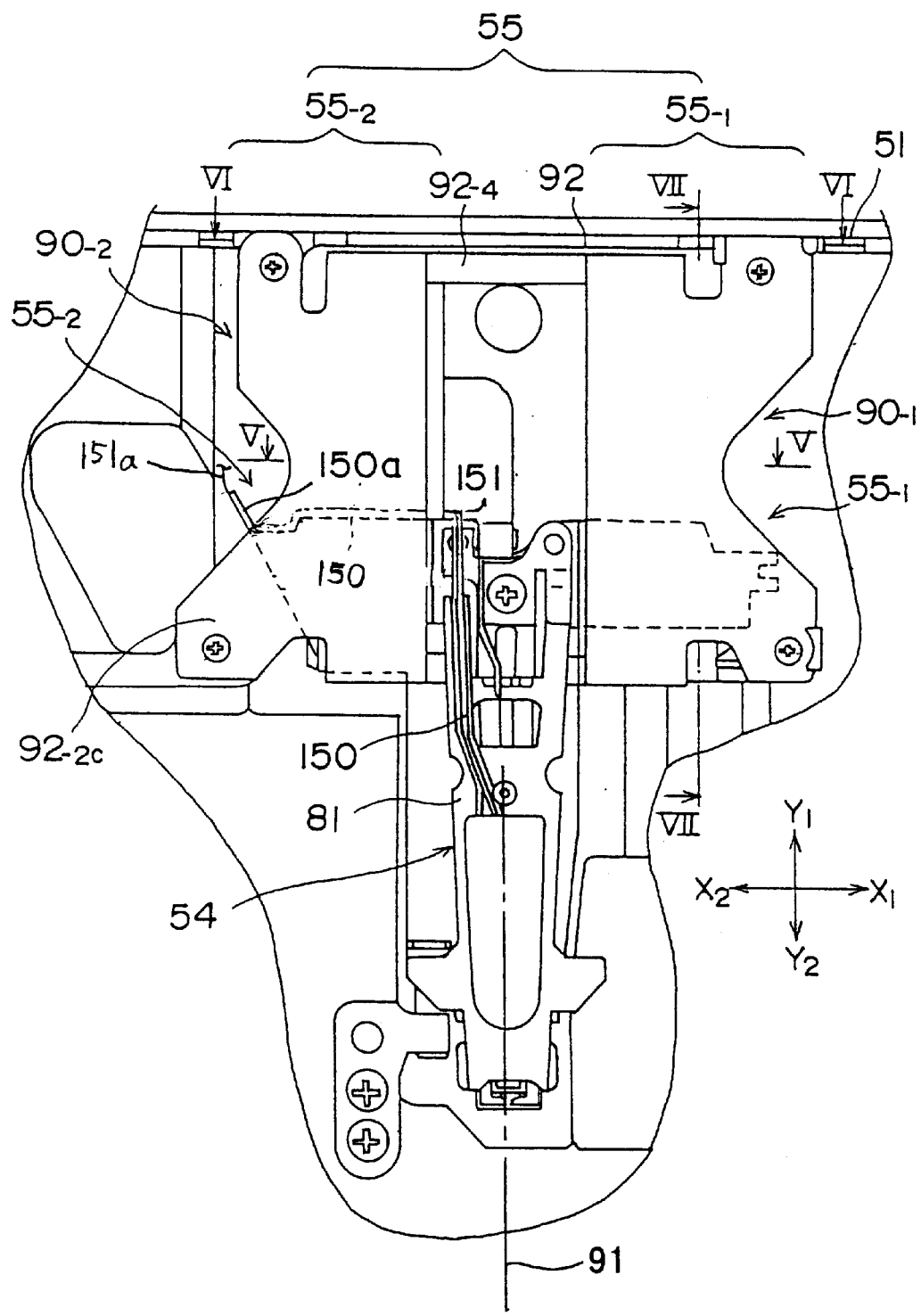
FIG. 4 is a top surface view of a head carriage and a voice coil motor of a disk apparatus according to the present invention.

As shown in FIG. 3 and FIG. 4, a strip of flexible cable 151 is connected to the lower magnetic head 71. Similar to the signal lead wire previously mentioned, this strip of flexible cable 151 extends laterally away from the carriage body 80 in the horizontal X2 direction and has an extended portion 151a having a length adequate to not restrict the movement of the head carriage 11.

Figure 5:
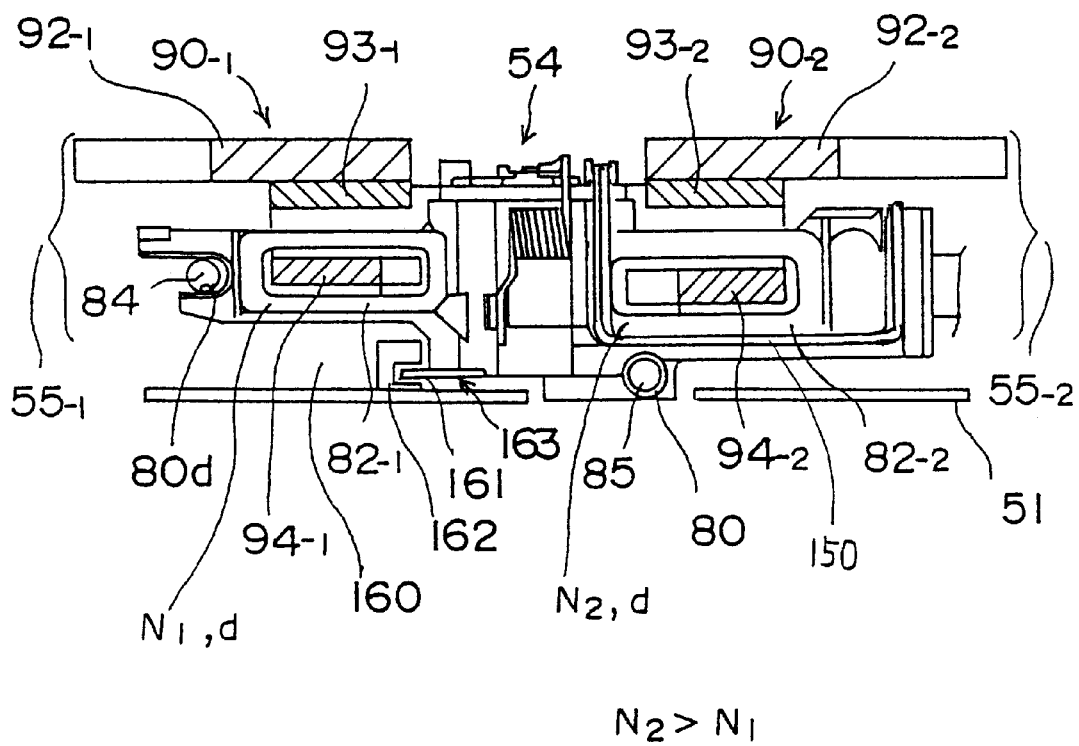
FIG. 5 is a cross-sectional view along the line V—V in FIG. 4.

As shown in FIG. 3, FIG. 4 and FIG. 5, the signal lead wire 150 attached to the upper magnetic head 70 is fixedly mounted on the upper head arm 81, lead along the upper head arm 81 rearward in the Y1 direction, further lead along the rear Y1 edge of the head carriage 54 laterally in the horizontal X2 direction and soldered to the extended flexible cable 151a at position 150a.

The voice coil motor 55 comprises voice coil motor 55-1 and voice coil motor 55-2 positioned parallel with respect to each other on the X1 and X2 sides, respectively, of a path along which the head carriage 54 moves. Voice coil motor 55-1 on the X1 side comprises X1-side magnetic circuit structure 90-1 and X1-side drive coil 82-1. Voice coil motor 55-2 on the X2 side comprises X2-side magnetic circuit structure 90-2 and X2-side drive coil 82-2. The X1-side magnetic circuit structure 90-1 and X-2 side magnetic circuit structure 90-2 are substantially symmetrical to each other with respect to a center line 91 of the path along which the head carriage 54 moves. A magnetic circuit structure assembly 100 comprises the X1-side magnetic circuit structure 90-1 and X-2 side magnetic circuit structure 90-2.

Figure 6:
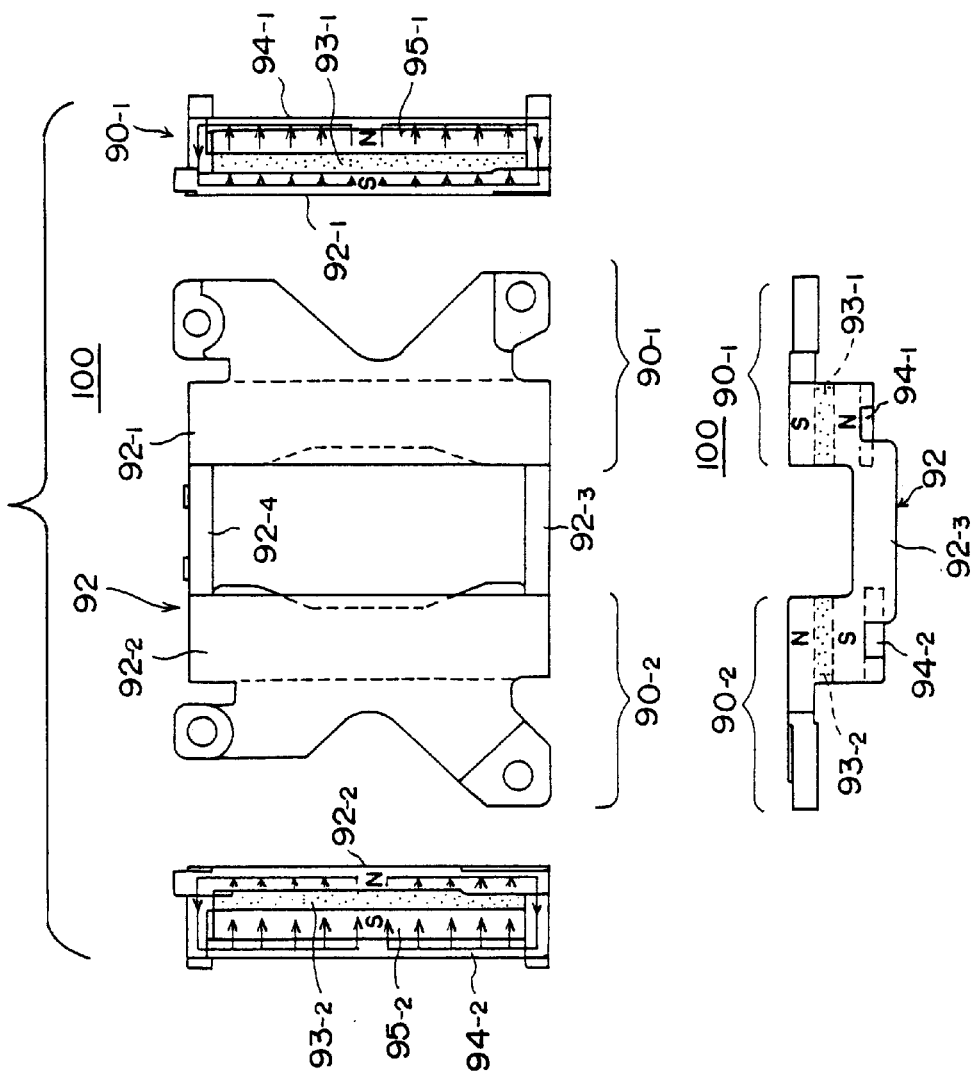
FIG. 6 is a diagram showing a magnetic circuit structure.
Figure 7:
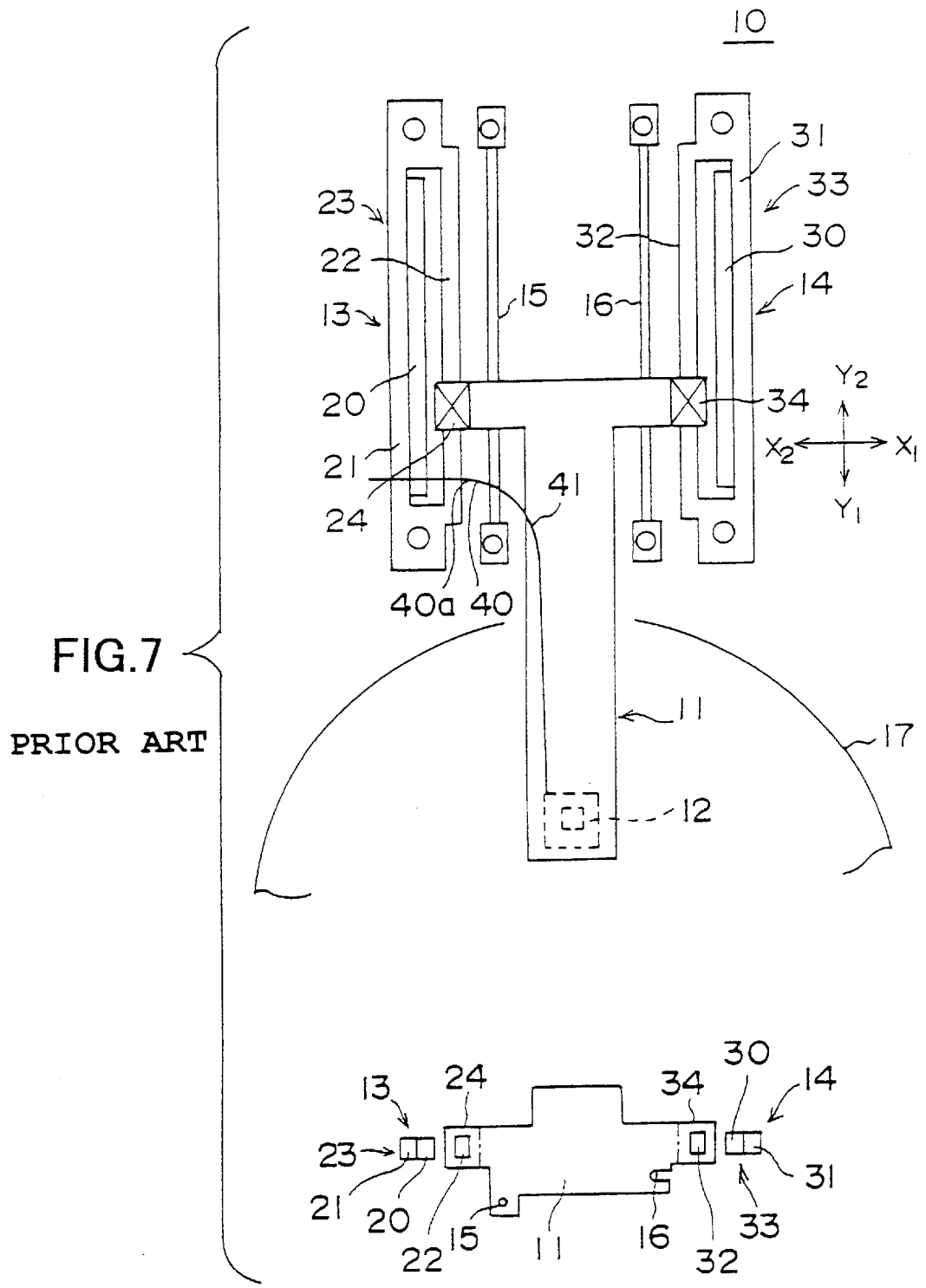
FIG. 7 is a diagram showing a conventional floppy disk device head carriage drive mechanism.

As shown in FIG. 6, the magnetic circuit structure assembly 100 has a base comprising a yoke member 92 for mounting a permanent magnet. This yoke member 92 in turn comprises an X1-side yoke portion 92-1 for mounting a permanent magnet and an X2-side yoke portion 92-2 for mounting a permanent magnet, as well as a rear Y2-edge frame portion 92-3 and a front Y1-edge frame portion 92-4 that connect the X1-side yoke portion 92-1 and the X2-side yoke portion 92-2 in such a way as to form a substantially square shape when viewed from above.

The X1-side magnetic circuit structure 90-1 comprises the X1-side yoke portion 92-1, a permanent magnet 93-1 fixedly mounted on a lower surface of the X1-side yoke portion 92-1, an X1-side drive coil yoke 94-1 and a magnetic gap 95-1. The permanent magnet 93-1 is essentially a long, narrow strip, an upper surface of which is the S-pole and a lower surface of which is the N-pole. The drive coil yoke 94-1 axially passes through the drive coil 82-1 and ends of the drive coil yoke 94-1 are affixed to the Y2-edge frame portion 92-3 and Y1-edge frame portion 92-4, respectively. The magnetic gap 95-1 is formed between the permanent magnet 93-1 and the X1-side drive coil yoke 94-1. The drive coil 82-1 surrounds and is radially spaced from the drive coil yoke 94-1.

The X2-side magnetic circuit structure 90-2 comprises the X2-side yoke portion 92-2, a permanent magnet 93-2 fixedly mounted on a lower surface of the X2-side yoke portion 92-2, an X2-side drive coil yoke 94-2 and a magnetic gap 95-2. The permanent magnet 93-2 is essentially a long, narrow strip, an upper surface of which is the N-pole and a lower surface of which is the S-pole. It will be observed that this pole configuration of permanent magnet 93-2 is the opposite of the pole configuration of permanent magnet 93-1. The drive coil yoke 94-2 axially passes through the drive coil 82-2 and ends of the drive coil yoke 94-2 are affixed to the Y2-edge frame portion 92-3 and Y1-edge frame portion 92-4, respectively. The magnetic gap 95-2 is formed between the permanent magnet 93-2 and the X2-side drive coil yoke 94-2. The drive coil 82-2 surrounds and is radially spaced from the drive coil yoke 94-2. Drive coil 82-1 and drive coil 82-2 are connected in series.

When a drive current is sent to the drive coils 82-1 and 82-2 by a control circuit and the X1-side voice coil motor 55-1 generates a propulsive force PF1 and the X2-side voice coil motor 55-2 generates a propulsive force PF2, the head carriage 54 is moved longitudinally in the Y1-Y2 direction so as to drag the extended portion 151a of the strip of flexible cable 151.

At this point, it may be helpful to consider an X1-side load and an X2-side load arising when the above-mentioned head carriage 11 is moved longitudinally in the Y1-Y2 direction, as noted previously.

Upon examining the strip of flexible cable 151, it will be noted that the X2-side load is greater than the X1-side load by an amount required to drag the extended portion 151a of the strip of flexible cable 151, thus creating a load imbalance.

Additionally, upon examining the guide rods 84 and 85 it will be further noted that the load on the bearing portion 80c when the carriage body 80 is slidably moved along the guide rod 85 is greater than the load on the U-shaped holding portion 80d when the carriage body 80 is slidably moved along the guide rod 84. Thus the load on the X2 side, that is, on the side on which are located the guide rod 85 and bearing portion 80c, is greater than the load on the X1 side, that is, on the side on which are located the guide rod 84 and the U-shaped holding portion 80d.

As a result, the load arising when the head carriage 54 is moved longitudinally in the Y1-Y2 direction is greater on the X2 side than on the X1 side, thus creating a load imbalance.

The embodiment of the present invention is configured so that the X1-side voice coil motor 55-1 and the X2-side voice coil motor 55-2 generate different propulsive forces PF1 and PF2, respectively, so as to correspond to different loads on said the X2 side and the X1 side of the head carriage 54 as described above.

Specifically, drive coil 82-1 of the X1-side voice coil motor 55-1 has electrical wire having a diameter of 1.16 mm, a number of turns N1 of said electrical wire being 102. By contrast, drive coil 82-2 of the X2-side voice coil motor 55-2 has electrical wire having a diameter of 1.16 mm, a number of turns N2 of said electrical wire being 236.

Accordingly, the propulsive force PF2 of the voice coil motor 55-2 of the X2 side is greater than the propulsive force PF1 of the voice coil motor 55-1 of the X1 side by an amount corresponding to an amount by which N2 exceeds N1, the difference between PF1 and PF2 corresponding to the imbalance in load between the X1-side and the X2 side.

As a result, the head carriage 54 is driven with a propulsive force greater on the X2 side than on the X1 side, that is, the X1 side and X2 side of the head carriage 54 are driven with the application of propulsive forces corresponding to the load on the X1 side and the load on the X2 side, respectively. Accordingly, it becomes possible to drive the head carriage with better precision and thus position the magnetic head with better precision than when the head carriage is driven with an identical propulsive force on each side. As a result of this more precise positioning, data can be accurately and reliably written to and read from even high-density disks having a track density in the range of 2,000 to 3,000 tpi.

Moreover, making the number of turns of the drive coil 82-1 different from the number of turns of the drive coil 82-2, and thereby making the propulsive force PF1 of the X1-side voice coil motor 55-1 different from the propulsive force PF2 of the X2-side voice coil motor 55-2, has the following two advantages, both believed to be novel.

First, as can be readily appreciated, the number of turns of the drive coil 82-1 and the number of turns of the drive coil 82-2 can be changed in relatively small increments of one single turn, making it possible to achieve precise variations in and between the propulsive force PF1 of the X1-side voice coil motor 55-1 and the propulsive force PF2 of the X2-side voice coil motor 55-2.

Second, as can be readily appreciated, the number of turns of the drive coil 82-1 and the number of turns of the drive coil 82-2 can be easily changed, making it possible to change the settings of the propulsive force of the first coil motor and the propulsive force of the second voice coil motor and thus making it possible to flexibly accommodate changes in design.

It should be noted that the drive coil 82-1 having the lesser number of turns is smaller in size than the drive coil 82-2 having the greater number of turns. As a result, as shown in FIG. 5 a space 160 is formed between the drive coil 82-1 and the frame 51. By using this space 160 to mount an encoder scale 161 on the carriage body 80 and a photocoupler 162 on the frame 51, a head carriage position detecting mechanism 163 can be provided for detecting a position of the head carriage.

Next, a description will now be given of variations of the disk apparatus according to the present invention.

As can be readily appreciated, the magnetic force of the permanent magnet 93-2 may be made greater than the magnetic force of the permanent magnet 93-1 as necessary. As a result, the propulsive force PF2 of the X2-side voice coil motor 55-2 will become greater than the propulsive force of the X1-side voice coil motor 55-1.

Additionally, the yoke of the X2-side magnetic circuit structure 90-2 may be made larger than the yoke of the X1-side magnetic circuit structure 90-1 as necessary. As a result, the number of lines of magnetic flux across the magnetic gap 95-2 of the X2-side voice-coil motor 55-2 will be larger than the number of lines of magnetic flux across the magnetic gap 95-1 of the X1-side voice coil motor 55-1 and thus the propulsive force PF2 of the X2-side voice coil motor 55-2 will become larger than the propulsive force of the X1-side voice coil motor 55-1.

Moreover, when the drive coil 82-1 and the drive coil 82-2 are connected in parallel, the number of turns in each drive coil may be made identical and a resistor may be connected in series to the drive coil 82-1 so as to make the current flowing to drive coil 82-2 greater than the current flowing to drive coil 82-1. As a result, the propulsive force PF2 of the X2-side voice coil motor 55-2 will become larger than the propulsive force of the X1-side voice coil motor 55-1.

The above description is provided to enable any person skilled in the art to make and use the invention and sets forth the best mode contemplated by the inventors of carrying out their invention. In addition, the present invention is not limited to the specifically disclosed embodiments and variations, and modifications may be made without departing from the scope of the present invention.

The present application is based on Japanese priority application No. 10-61611 filed on Mar. 12, 1998, the entire contents of which are hereby incorporated by reference.

What is claimed is:

1. A disk apparatus comprising:
   a frame;
   disk rotating means for supportably rotating a disk;
   a head writing data to and reading data from the rotating disk;
   a head carriage radially moving said head relative to the rotating disk;
   a first voice coil motor, having a first magnetic circuit structure and a first drive coil which is fixed on a first side of said head carriage, moving said head carriage; and
   a second voice coil motor, having a second magnetic circuit structure and a second drive coil which is fixed on a second side of said head carriage, moving said head carriage,
   wherein said first drive coil and said second drive coil generate different propulsive forces that depend on different loads arising on the first side and the second side of said head carriage when said head carriage is moved, and
   wherein said first voice coil motor and said second voice coil motor are configured so that a number of turns in said first drive coil and a number of turns in said second drive coil differ so as to generate different respective propulsive forces corresponding to unequal loads on said first side and said second side of said head carriage.

2. The disk apparatus as claimed in claim 1 wherein said magnetic circuit structure is fixedly mounted on said frame.

3. The disk apparatus as claimed in claim 2, wherein the first drive coil is smaller in size than the second drive coil.

4. The disk apparatus as claimed in claim 2, wherein a predetermined member is provided in a space formed by a size difference between the first and second drive coils.

5. The disk apparatus as claimed in claim 1, further comprising:
   a signal wire for transmitting signals to said head, a first end of said signal wire connected to said head, a second end of said signal wire extending from said second side of said head carriage on which said second first voice coil motor is provided,
   wherein said drive coil of said first voice coil motor and said drive coil of said second voice coil motor are configured so that said second voice coil motor generates a propulsive force larger than a propulsive force generated by said voice coil motor by an amount corresponding to a load of said signal wire exerted on said second side of said head carriage when said head carriage is moved.

6. A disk apparatus comprising:
   a frame;
   disk rotating means for supportably rotating a disk;
   a head for writing data to and reading data from the rotating disk;
   a head carriage for radially moving said head relative to the rotating disk;
   a signal wire transmitting signals to said head, a first end of said signal wire being connected to said head; and
   a first voice coil motor and a second voice coil motor for moving said head carriage, said first voice coil motor and said second voice coil motor each comprising:
   a magnetic circuit structure; and
   a drive coil fixedly mounted on said head carriage;
   a second end of said signal wire being extended from a side of said head carriage on which said second voice coil motor is provided,
   said second voice coil motor generating a propulsive force larger than a propulsive force generated by said first voice coil motor by an amount corresponding to a load of said signal wire exerted on the side of said head carriage when said head carriage is moved,
   wherein said first voice coil motor and said second voice coil motor are configured so that a number of turns in said drive coil of said first voice coil motor and a number of turns in said drive coil of said second voice coil motor differ so that the propulsive force generated by said second voice coil motor is larger than a propulsive force generated by said first voice coil motor by an amount corresponding to a load of said signal wire exerted on the side of said head carriage.

7. The disk apparatus as claimed in claim 6, wherein said magnetic circuit structure is fixedly mounted on said frame.

8. A disk apparatus comprising:
   a frame;
   disk rotating means for supportably rotating a disk;
   a head writing data to and reading data from the rotating disk;
   a head carriage radially moving said head relative to the rotating disk;
   a first voice coil motor, having a first magnetic circuit structure and a first drive coil which is fixed on a first side of said head carriage, moving said head carriage; and
   a second voice coil motor, having a second magnetic circuit structure and a second drive coil which is fixed on a second side of said head carriage, moving said head carriage,
   wherein said first drive coil and said second drive coil generate different propulsive forces that depend on different loads arising on the first side and the second side of said head carriage when said head carriage is moved, and wherein said first voice coil motor and said second voice coil motor are configured so that a number of turns in said first drive coil and a number of turns in said second drive coil differ so as to generate different respective propulsive forces corresponding to unequal loads on said first side and said second side of said head carriage wherein a head carriage position detecting mechanism which detects a position of said head carriage is provided in a space formed by a size difference between the first and second drive coils.

9. The disk apparatus as claimed in claim 8, wherein said drive coil of said first voice coil motor and said drive coil of said second voice coil motor are configured so that a propulsive force generated by said second voice coil motor is larger than a propulsive force generated by said first voice coil motor by an amount corresponding to a load of a signal wire exerted on said second side of said head carriage.

10. The disk apparatus as claimed in claim 8, wherein said magnetic circuit structure is fixedly mounted on said frame.

11. A disk apparatus comprising:

a frame;

a disk rotating mechanism supportably rotating a disk;

a head writing data to and reading data from the rotating disk;

a head carriage radially moving the head relative to the rotating disk;

a first voice coil motor, having a first magnetic circuit structure and a first drive coil which is fixed on a first side of the head carriage, moving the head carriage; and a second voice coil motor, having a second magnetic circuit structure and a second drive coil which is fixed on a second side of the head carriage, moving the head carriage, said first and second drive coils generating different propulsive forces that depend on different loads arising on the first and second sides of the head carriage when the head carriage is moved;

said first and second voice coil motors having mutually different sizes and being configured so that a number of turns in the first drive coil and a number of turns in the second drive coil differ so as to generate different respective propulsive forces corresponding to unequal loads on the first and second sides of the head carriage.

12. A disk apparatus comprising:

a frame;

a disk rotating mechanism supportably rotating a disk;

a head writing data to and reading data from the rotating disk;

a head carriage radially moving the head relative to the rotating disk;

a signal wire, transmitting signals to the head, having a first end coupled to the head;

first and second voice coil motors moving the head carriage, each of said first and second voice coil motors comprising:

a magnetic circuit structure, and a drive coil fixedly mounted on the head carriage;

said signal wire having a second end extending from a side of the head carriage on which the second voice coil motor is provided, said second voice coil motor generating a propulsive force larger than a propulsive force generated by said first voice coil motor by an amount corresponding to a load of the signal wire exerted on the side of the head carriage when the head carriage is moved, said first and second voice coil motors being configured such that a number of turns in the drive coil of the first voice coil motor and a number of turns in the drive coil of the second voice coil motor differ and the drive coils of the first and second voice coil motors have mutually different sizes so that the propulsive force generated by the second voice coil motor is larger than the propulsive force generated by the first voice coil motor by an amount corresponding to a load of the signal wire exerted on the side of the head carriage.

\* \* \* \* \*